United States Patent
McCabe et al.

[11] Patent Number: 6,052,989
[45] Date of Patent: Apr. 25, 2000

[54] EMISSION CONTROL SYSTEM FOR INTERNAL COMBUSTION ENGINES

[75] Inventors: Robert Walter McCabe, Lathrup Village; Raymond Lawrence Willey, Redford, both of Mich.

[73] Assignee: Ford Global Technologies, Inc., Dearborn, Mich.

[21] Appl. No.: 09/012,440

[22] Filed: Jan. 23, 1998

[51] Int. Cl.⁷ ...................................... F01N 3/00
[52] U.S. Cl. ................... 60/285; 60/276; 60/301
[58] Field of Search .............. 60/285, 276, 274, 60/286, 284, 301, 299

[56] References Cited

U.S. PATENT DOCUMENTS

| | | | |
|---|---|---|---|
| 5,060,604 | 10/1991 | Seki et al. . | |
| 5,083,427 | 1/1992 | Anderson . | |
| 5,159,810 | 11/1992 | Grutter et al. | 60/274 |
| 5,207,057 | 5/1993 | Kayanuma . | |
| 5,233,829 | 8/1993 | Komatsu . | |
| 5,255,512 | 10/1993 | Hamburg et al. | 60/274 |
| 5,325,666 | 7/1994 | Rutschmann . | |
| 5,363,091 | 11/1994 | Kotwicki et al. | 340/439 |
| 5,400,592 | 3/1995 | Mukaihira et al. | 60/274 |
| 5,433,071 | 7/1995 | Willey et al. | 60/274 |
| 5,509,267 | 4/1996 | Theis | 60/274 |
| 5,570,574 | 11/1996 | Yamashita et al. . | |
| 5,582,003 | 12/1996 | Patil et al. . | |
| 5,771,685 | 6/1998 | Hepburn | 60/274 |
| 5,782,087 | 7/1998 | Kinugasa et al. | 60/276 |
| 5,826,426 | 10/1998 | Weber et al. | 60/274 |
| 5,848,528 | 12/1998 | Liu | 60/274 |

FOREIGN PATENT DOCUMENTS

| | | |
|---|---|---|
| 3518756A1 | 11/1986 | Germany . |
| 1110851 | of 1989 | Japan . |
| 2000046 | 6/1978 | United Kingdom . |

*Primary Examiner*—Thomas Denion
*Assistant Examiner*—Binh Tran
*Attorney, Agent, or Firm*—Lorraine S. Melotik; Roger L. May

[57] ABSTRACT

An emission control system is disclosed having an emission regulating system which includes an exhaust gas sensor positioned between a light-off catalyst and conditioning catalyst to provide more robust emissions.

12 Claims, 1 Drawing Sheet

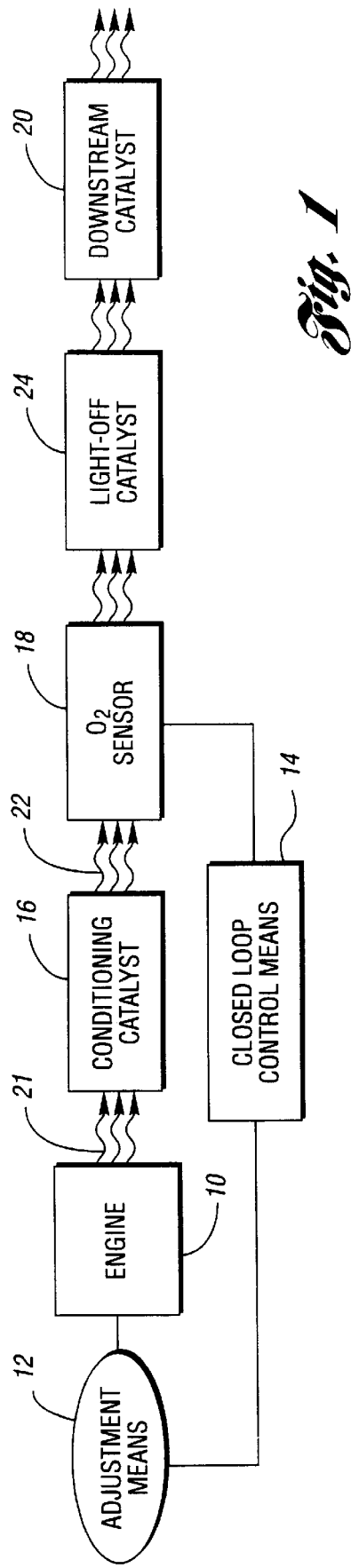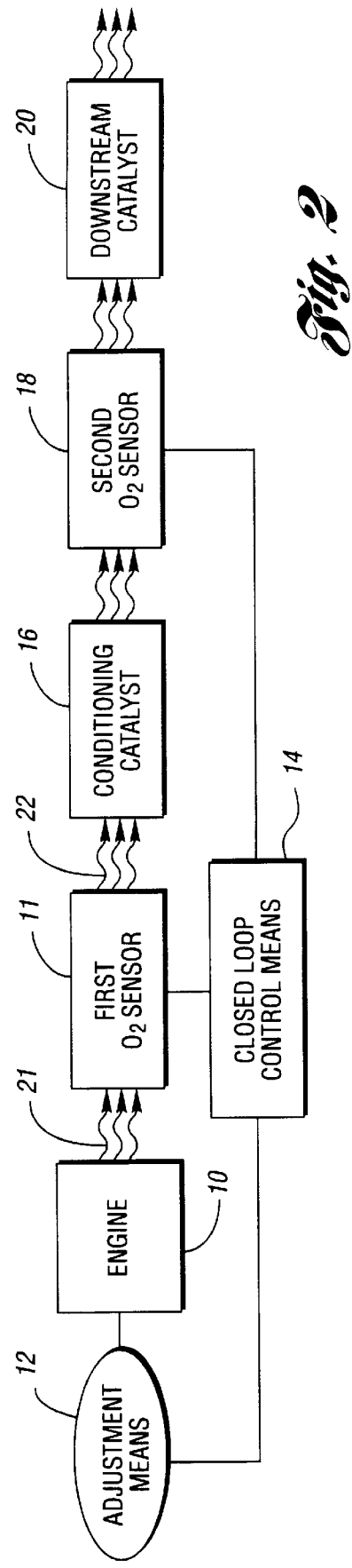

EMISSION CONTROL SYSTEM FOR INTERNAL COMBUSTION ENGINES

FIELD OF INVENTION

The invention generally relates to the control of noxious components in exhaust gas streams and internal combustion automotive engines. More particularly, the invention relates to an apparatus having an emission assembly which includes an exhaust gas oxygen sensor positioned between a conditioning catalyst and a light-off catalyst.

BACKGROUND ART

The combustion of air/fuel mixtures in internal combustion engines, such as those found in automobiles, produces an exhaust gas stream comprised of various gaseous components. Some of these components, such as hydrocarbons (HC), carbon monoxide (CO), and oxides of nitrogen ($NO_x$), may be termed noxious components. Those skilled in the art will appreciate that oxides of nitrogen refers to both NO and $NO_2$. In recent years, environmental concerns have led to increasingly stricter regulations concerning the maximum allowed emissions of these particular components.

Attempts to eliminate or control these noxious components have most recently involved the use of three-way catalysts (TWC) which typically oxidize HC and CO, while simultaneously reducing $NO_x$. Such a three-way catalytic converter is located in an exhaust line downstream from the engine combustion chamber. With the use of three-way catalysts, the exhaust gas stream typically passes through a combination of precious metals coated onto stabilized alumina and/or rare earth supporting phases carried on a monolithic ceramic or metallic cellular core.

However, optimizing both the oxidation of HC and CO and the simultaneous reduction of $NO_x$ requires close control of the air/fuel ratio entering the internal combustion engine. Optimum reduction of all three components occurs when the air/fuel ratio is close to stoichiometric, i.e., approximately 14.5–14.6 kilograms of air to 1 kilogram of gasoline.

In order to achieve and maintain the desired air/fuel ratio, exhaust gas oxygen (EGO) sensors and closed loop control circuits have been used in conjunction with three-way catalysts. Such emission control systems generally measure the oxygen concentration of the exhaust gas and adjust the relative amounts of air and fuel supplied to the engine in response thereto. EGO sensors provide a feedback assessment whenever the air/fuel ratio is other than a predetermined level, i.e., stoichiometric levels, to indicate whether the mixture is richer or leaner than the stoichiometric level. The stoichiometric level is known as the closed loop control point, and within narrow limits, may be selected as desired.

While the use of three-way catalysis has been found to be useful, its accuracy and effectiveness is impaired with the use of various alternative automotive fuels which results in a significant lean shift of the closed loop control point. It is believed that the low molecular weight of hydrogen allows it to preferentially diffuse through the protective spinal sheath surrounding the electrode of the typical EGO sensor. As a result, the relative hydrogen concentration at the electrode surface is higher than the relative hydrogen concentration at the outer surface of the sheath. This higher relative concentration causes the EGO sensor to detect a richer gas mixture than is present. As a result, the EGO sensor experiences a "shift." Alternative fuels are generally designated as those other than traditional gasoline and diesel fuels. Illustrative examples are natural gas, methanol, methane, propane (LPG), ethanol and combinations of these fuels.

In general, lean shifts result in inaccurate control of the air/fuel mixture entering the engine. That is, because the EGO sensor believes the air/fuel mixture to be richer in fuel than it is actually is, the closed loop control system directs a reduction in the amount of fuel entering the engine. The air/fuel mixture entering the engine thus becomes leaner than what is actually called for, resulting in a lean shift.

U.S. Pat. No. 5,433,071 to Willey et al. and assigned to Ford Motor Company, incorporated for reference herein, discloses An Apparatus And Method For Controlling Noxious Components Using A Conditioning Catalyst For Removing Hydrogen. Under the '071 patent, a conditioning catalyst removes hydrogen from the exhaust stream and an EGO sensor, in communication with the conditioned exhaust gas, generates a signal in response to the sensed oxygen concentration of the conditioned exhaust gas. The air/fuel mixture entering the engine is adjusted by a closed loop control means in response to the signal generated by the EGO sensor. The removal of hydrogen from the exhaust gas stream eliminates lean shifts and allows the oxygen sensor and closed loop control means to accurately control the air/fuel ratio.

One of the key benefits of this conditioning catalyst approach is extremely robust emissions durability. The benefits of a conditioned exhaust stream are equally important for gasoline vehicles. However, one significant difference between natural gas as compared to gasoline vehicles is that cold-start hydrocarbon emissions are not a particular concern, primarily, because natural gas consists predominantly of unburned fuel (methane) which is excluded from the hydrocarbon standard. Moreover, since natural gas is a gaseous fuel, it has none of the cylinder-wall wetting problems attributed to cold-start emissions with liquid fuels such as gasoline. Given the durability benefits of the conditioning catalyst in natural gas fuels, there is a need for achieving such benefits with the use of gasoline vehicles.

There is thus a need for a catalytic assembly which will achieve very low emissions of noxious components like $NO_x$, HC and CO with a liquid fuel such as gasoline, while exhibiting long term durability and little or no loss in efficiency.

In addition, further research has indicated that a small calibrated reduction of oxygen occurs in addition to hydrogen before the main catalyst and is useful to tolerate greater engine combustion variability and optimize air/fuel control. Cylinder-to-cylinder air/fuel variability or engine bank-to-bank air/fuel variability beyond an acceptable amount manifests itself in a lean shift in the bulk exhaust gas composition such that desired catalyst efficiencies cannot be realized. This occurs whether a particular cylinder is either rich or lean. As provided in the '071 patent, a low-volume catalyst placed before the controlling HEGO sensor removes some of the oxygen and other reactive gases which effects partial gas equilibration and reduces the emission impact of cylinder-to-cylinder or engine combustion variability. There is still a further need to eliminate lean shifts in the bulk exhaust gas composition so that desired catalyst efficiencies can be realized.

In addition, there is also a further need to reduce the reactive gas load on the catalyst system for a particular component of the catalyst system.

SUMMARY OF THE INVENTION

It is thus an object of the present invention to provide an emission control system and a method for the control of noxious components in exhaust streams produced by the combustion of air/fuel mixtures in internal combustion engines.

It is a further object of this invention to provide an emission control system having particular applicability for use with internal combustion engines to satisfy low emission vehicle and ultra-low emission vehicle standards.

It is yet another object of this invention to provide a method of limiting the available exothermic energy to a catalyst system to prevent thermal failure of any one component of the catalyst system.

It is another object of this invention to eliminate lean shifts and enhance the efficiency of the main underbody catalysts to convert oxides of nitrogen.

These and other objects of the present invention have been achieved with an emission control system wherein hydrogen is removed by a conditioning catalyst from the exhaust gas stream to produce a conditioned exhaust gas. A light-off catalyst is placed in communication with the conditioned exhaust stream which heats the conditioned exhaust stream to its "light-off" temperature, at which point the catalyst begins to convert unburned hydrocarbon to harmless gas. An exhaust gas oxygen sensor is placed between the conditioning catalyst and the light-off catalyst and is in communication with the conditioned exhaust gas to sense the oxygen concentration of the conditioned exhaust gas. To achieve low emission standards, the conditioning catalyst is combined with a light-off catalyst to meet hydrocarbon emission objectives. As a result, the apparatus of this invention provides an emission control system having an exhaust gas oxygen sensor (EGO) sandwiched between a small EGO sensor conditioning catalyst on the upstream side and a larger light-off catalyst on the downstream side. By this configuration, the conditioning catalyst delivers exothermic heat of reaction to the light-off catalyst so that it rapidly reaches its "light-off" temperature which thus increases conversion efficiencies.

BRIEF DESCRIPTION OF THE DRAWINGS

FIG. 1 is a flow chart depicting the emission regulating assembly including a HEGO sensor sandwiched between a conditioning catalyst on the upstream side and a light-off catalyst on the downstream side and further including additional downstream catalysts; and FIG. 2 is a flow chart depicting an emission regulating assembly including a first and second oxygen sensor having a conditioning catalyst placed therebetween and further including additional downstream catalysts.

DETAILED DESCRIPTION OF THE BEST MODE

One of the key benefits of the conditioning catalyst approach as outlined in U.S. Pat. No. 5,433,071, assigned to Ford Motor Company, involves the extremely robust emissions durability. As an example, testing indicated that CNG vehicles containing the conditioning catalyst should satisfy 120K super ultra-low emission vehicle standards whereas corresponding vehicles with traditional "HEGO first" configurations are not likely to even meet the higher, less difficult, ultra-low emission vehicle standards.

One feature of the natural gas vehicles, however, is that cold-start hydrocarbon emissions are not a particular concern, primarily because they consist predominantly of unburned fuel, methane, which is excluded from the hydrocarbon standard. Also, since natural gas is a gaseous fuel, it has none of the cylinder-wall wetting problems that contribute to cold-start emissions with liquid fuels such as gasoline. Given the durability benefits of the conditioning catalyst concept for CNG, it is desirable to extend its use to gasoline vehicles. Achieving very low emissions from gasoline vehicles, however, generally requires the use of close-coupled light-off catalysts to maintain hydrocarbon emission objectives. Under this invention, the term "light-off" catalyst refers to a catalyst designed to reach its "light-off" temperature, the temperature at which the catalyst begins to convert unburned hydrocarbons from the exhaust stream to harmless gases. The light-off temperature of a catalyst is the temperature at which the catalyst can convert 50% of carbon monoxide or hydrocarbons or nitrogen oxide.

While a catalyst may be used as both a light-off catalyst and a conditioning catalyst, experimental evidence indicated that the optimum design parameters for the conditioning catalyst and the light-off catalyst differ to the point where a single catalyst could not function effectively as both a light-off catalyst and a conditioning catalyst. As an example, the optimum volume of a conditioning catalyst is 10–20% of the engine swept volume (ESV). For a light-off catalyst, the optimum catalyst volume is 30–60% of the engine swept volume. Similarly, conditioning catalysts benefit from open cell structures (300 cells per square inch or less) versus 350 cells per square inch or higher for light-off catalysts.

Moreover, the optimum catalyst formulation is different for the two types of catalysts. Conditioning catalysts, in particular, should not contain oxygen storage agents, such as ceria, because they dampen the response of the HEGO sensor. In contrast, light-off catalysts often show improved light-off characteristics when they contain oxygen storage agents. All of the above factors suggest that separate catalysts are preferred for gasoline applications to simultaneously achieve exhaust gas conditioning and good light-off performance. Separate catalysts are further preferred for all fuels in an effort to achieve low emissions. Accordingly, the present invention calls for both a light-off catalyst and a conditioning catalyst, each suited for a particular function, and both packaged in a tightly sandwiched emission assembly around an EGO sensor, preferably a HEGO sensor, wherein the entire emission assembly is mounted close to the engine exhaust manifold.

In addition, research indicates that the use of two catalysts provides beneficial results. Prior to the research, it was believed that the conditioning catalyst might act as a thermal sink during light-off, robbing the light-off catalyst of heat needed to ensure its quick light-off. On the contrary, experimental evidence indicates that heat generated by the conditioning catalyst is utilized by the light-off catalyst so that it can rapidly reach its light-off temperature, and thus the emission control system of the present invention may achieve greater conversion efficiencies than prior art systems.

FIG. 1 depicts the emission control system of the present invention. The present emission control system wherein an exhaust gas oxygen sensor 18, preferably a HEGO sensor, is sandwiched between a conditioning catalyst 16 on the upstream side and a light-off catalyst 24 on the downstream side. As set forth herein, an "emission control system" includes an emission regulating assembly, closed loop control means, adjustment means, as well as downstream catalysts. An "emission regulating assembly" as provided herein includes a conditioning catalyst, a light-off catalyst and an exhaust gas oxygen sensor.

As depicted in FIG. 1, the emission regulating assembly is intended to be used in combination with additional catalysts located farther downstream and thus referred to as downstream catalysts 20. One skilled in the art would recognize that this arrangement should be modified for varying engine configurations. For example, with the 8 cylinder 5.4 liter engine having two exhaust banks, a separate emission regulating assembly is mounted on each exhaust bank of the engine. Accordingly, in the preferred embodiment, two 90 cubic inch main downstream catalysts are deployed in an underbody location downstream of the point where the exhaust from the two engine banks is combined. There will preferably be one emission regulating assembly for each EGO sensor 18 employed for feedback or closed loop control 14 on the engine 10. In conjunction with oxygen sensor 18 and closed loop control means 14, there is further adjustment means 12 to modify the air/fuel parameters prior to combustion in the engine 10.

The conditioning catalyst 16 of FIG. 1 is positioned so as to be in communication with the exhaust stream 21 exiting engine 10. Most preferably, conditioning catalyst 16 will be positioned to lie in the path of the exhaust stream 21 so that the exhaust gases or emissions will pass through the conditioning catalyst 16 along a straight uninterrupted axial flow.

In the preferred embodiment, the emission regulating assembly would be designed for mounting as close to the engine exhaust manifold as possible to ensure fast warm-up of the conditioning and light-off catalysts. In the preferred embodiment, the conditioning and light-off catalysts are spaced close to one another, most preferably within the range of between 1 inch and 4 inches.

The conditioning catalyst 16 is a low volume, low reactivity, highly durable catalyst designed to preferentially oxidize hydrogen with a corresponding stoichiometric amount of oxygen. This is achieved by sizing the conditioning catalyst 16 such that the oxidation of hydrogen to water is preferential over other competing reactions such as the oxidation of carbon monoxide and hydrocarbons or the reduction of nitrogen oxide. Conversion of these noxious components must be minimized to the extent that negligible damping of the EGO sensor results.

The conditioning catalyst 16 is most preferably comprised of a monolithic cellular substrate. Metallic and ceramic substrates such as those typically used in the construction of three-way catalysts are suitable. Cordierite and the like are examples of suitable ceramic substrate material. The structure of conditioning catalysts 16 is honey-combed and is analogous to that of traditional three-way catalysts. Such structures are well known to those skilled in the art.

Optionally, the monolithic catalyst substrate may have arrayed thereon a refractory inorganic oxide. Suitable examples are alumina, silica, zirconia and other stabilizing agents such as lanthana or baria or mixtures thereof. Most preferably, the conditioning catalyst 16 will have a refractory inorganic oxide layer comprised predominantly of alumina.

The catalyst substrate or optionally, the refractory inorganic oxide layer, will be impregnated with one or more noble metals. Suitable noble metals are palladium, platinum, and rhodium. The most preferred noble metal for use herein is palladium.

In general, the conditioning catalyst 16 will have a loading of noble metal on the substrate from about 20 to 400 grams per cubic foot ($g/ft^3$). Preferred loadings will be from about 40 to 250 $g/ft^3$. The most preferred loading is 100 $g/ft^3$.

The ability of the conditioning catalyst to preferentially oxidize hydrogen is dependent upon the sizing the cell density of the conditioning catalyst 16 and the particular loading of noble metal as well as the volume of the conditioning catalyst and the flow rate of exhaust gases through the conditioning catalyst. The latter two are often expressed in terms of a single parameter called space velocity, representing the ratio of the exhaust gas volumetric flow rate to the volume of the catalyst element. The conditioning catalyst 16 must operate without significantly damping the response of the exhaust gas oxygen sensor 18. Practically, this is found to be the case when conversion of non-hydrogen species such as CO, HC and nitrogen oxides are less than 50% across the conditioning catalyst. With the exception of oxygen consumed in the oxidation of hydrogen, the oxygen concentration of the conditioned exhaust gas 22 exiting conditioning catalyst 16 should approximate, as close as possible, that of the exhaust gas 21 exiting the engine 10.

Materials which are believed to function as oxygen "sinks" are to be avoided in the conditioning catalyst 16. For example, the most preferred conditioning catalyst 16 will be free of ceria which can reversibly store oxygen. In particular, the oxidation of hydrocarbons and carbon monoxide by such stored oxygen is to be avoided.

It has been found that the desired performance characteristics, i.e., high conversion of hydrogen, with concomitant low damping of the EGO sensor response, are achieved when a conditioning catalyst 16 has a particular space velocity.

The conditioning catalyst 16 should be sized so as to yield a space velocity of from 500,000 $h^{-1}$ to 1,000,000 $h^{-1}$ at peak engine exhaust flow rates. Space velocity is defined as the volumetric flow rate of exhaust gases under standard conditions of one atmosphere pressure and 20° C. temperature divided by the volume of catalyst through which the exhaust gases are passed. A most preferred maximum space velocity is about 700,000 $h^{-1}$. In the preferred embodiment, it has been found that an oxygen capacity should be kept below 500 to 1,000 micro-moles of oxygen atoms to ensure minimal damping effect.

It has further been found that the conditioning catalyst 16 will most preferably reduce or convert less than 40% of the overall nitrogen oxide present in the exhaust gas stream 21 exiting engine 10. However, more importantly, with respect to hydrogen, it has been predicted that conversion efficiencies of over 95% can be achieved with the use of the instant invention. Thus, it will be appreciated that the passage of the exhaust gas 21 through conditioning catalyst 16, results in the production of a conditioned exhaust gas 22. The conditioned exhaust gas 22, schematically illustrated in FIG. 1, may be characterized as having a hydrogen concentration which is at least 75% less than that of the exhaust gas stream 21 exiting the internal combustion engine 10. Preferably, conditioned exhaust gas stream 22 will have 80% less hydrogen as compared to the exhaust gas stream 21 entering conditioning catalyst 16. Most preferably, conditioned exhaust gas 22 will have less than 10% of the hydrogen present in the pre-conditioned exhaust gas 21.

A suitable conditioning catalyst 16 may have a dimension from about 1–5 inches in diameter and most preferably about 2–3 inches in diameter. They may have a length between 2–5 inches and more preferably between 3–4 inches. The conditioning catalyst may further have a volume of from about 10–40 $in^3$. In addition, the catalyst will have between 75–400 cells per square inch (cpi). Cell densities of 200–350 cpi are most preferred.

The light-off catalyst preferably has between 300 and 500 cpi, a diameter of less than 5 inches and a length of less than 5 inches. The light-off catalyst further preferably has a volume between 30 and 50 $in^3$.

With respect to EGO sensor 18, EGO sensors which are of a switching type or step function are suitable for use herein. Both heated exhaust gas sensors (HEGO) and universal exhaust gas (UEGO) sensors are suitable and may be of either cylindrical or planar configuration. Heated exhaust gas sensors are preferred. In general, the EGO sensor will be comprised of a ceramic body having at least one portion in communication with the conditioned exhaust stream 22 exiting conditioning catalyst 16 and a second portion not located in the conditioned exhaust stream 22. The surface of the ceramic body, typically comprised of zirconium dioxide is provided with gas permeable electrodes. Suitable electrodes may be comprised of platinum. When the oxygen concentration at that portion of the ceramic body which is in communication with the exhaust gas 21 differs from the oxygen concentration at that portion of the body not in communication with the exhaust path, a voltage is generated between each of the electrodes. The voltage is a measure of the difference in the oxygen concentrations at the respective portions of the sensor body.

As indicated above, most preferably, the EGO sensor 18 will be of a variety known as a heated exhaust gas oxygen sensor. Such a sensor has a ceramic body heated by an internal heating element. Most preferred HEGO sensors are those commercially available from Bosch & NTK.

As part of the main, downstream catalyst 20, standard three-way catalysts are suitable for use. In particular, suitable three-way catalysts will be comprised of a ceramic or metallic monolithic substrate having a noble metal impregnated thereon such as those commonly available from Corning, Inc. of New York. Suitable noble metals are those as described above with respect to the conditioning catalyst 16. Most preferably, the noble metal will be selected from the group consisting of palladium, platinum, rhodium and mixtures thereof. Total loadings of noble metal from 40 g/ft$^3$ to 150 g/ft$^3$ are suitable. The most preferred combinations include mixtures of palladium and rhodium at weight ratios ranging from 25-to-1 to 3-to-2. The most preferred palladium-to-rhodium ratios are between 10-to-1 and 1.5-to-1.

Three-way catalysts suitable for use in the invention will have from 350–400 cells per square inch and a maximum space velocity of 100,000 h$^{-1}$ at wide open throttle conditions. Downstream, three-way catalysts, will have a dimension from about 1–10 inches in diameter, and a volume of about 75–100 in$^3$.

Experimental Evidence

The emission regulating assembly has been tested on a gasoline sister vehicle of the 5.4 liter E-350 van on which super ultra-low emission vehicle standards were achieved with CNG fuel utilizing only the conditioning catalyst and without a light-off catalyst. The first test involved simply fitting the gasoline vehicle with the same system as used on the natural gas vehicle and aging the catalysts for 4K miles on the road. Tests from these runs are summarized in Graph 1. An important figure to note is the non-methane hydrocarbon emissions averaged over five FTP tests. The average is 0.122 g/mi and it exceeds the ULEV standard of 0.117 g/mi for vehicles in this weight class. In comparison, typical non-methane hydrocarbon emissions for the CNG sister vehicle with the same catalyst configuration were less than 0.02 g/mi.

GRAPH 1: EMISSION TESTS OF 4K AGED CATALYSTS

|  | BARO EXH | CT-C CT-H | N/C D/C | N/H D/H | O2-B O2-A | FE 1 FE 2 | TOTAL | | | HNOX NMHC | CVS HWY |
|---|---|---|---|---|---|---|---|---|---|---|---|
|  | ODOM | RPM | VAC | VIOL | TEMP | FE 3 | HC | CO | NOX | CO2 | M-H |
| TEST 1 | 29.08 | 0.9 | 1198 | 1110 | 0.6 | 11.8 | 2.78 | 20.0 | **** | 0.000 | 12.4 |
|  | 1055.6 | 2.1 | 885 | 779 | 0.3 | 11.7 | 0.167 | 0.461 | 0.223 | 0.149 | 0.0 |
|  | 4822 | 737 | 19.3 | 0 | 80.0 | 13.2 | 93.5 | 97.6 | 97.7 | 717.1 | 0.0 |
| TEST 2 | 29.23 | 1.6 | 0 | 0 | 0.6 | 11.7 | 2.66 | 22.7 | 9.34 | 0.000 | 12.5 |
|  | 1036.1 | 1.4 | 0 | 0 | 0.3 | 11.9 | 0.130 | 0.681 | 0.228 | 0.112 | 0.0 |
|  | 123 | 0 | 19.6 | 0 | 74.0 | 13.5 | 94.7 | 96.8 | 97.4 | 708.8 | 0.0 |
| TEST 3 | 29.24 | 1.7 | 1045 | 1026 | 0.6 | 11.8 | 2.32 | 20.2 | 9.23 | 0.000 | 12.5 |
|  | 1028.5 | 1.4 | 799 | 749 | 0.3 | 11.9 | 0.153 | 0.689 | 3.279 | 0.131 | 0.0 |
|  | 4833 | 659 | 19.4 | 0 | 74.0 | 11.6 | 92.3 | 96.4 | 96.3 | 707.1 | 0.0 |
| TEST 4 | 29.23 | 1.2 | 0 | 0 | 0.6 | 11.8 | 2.57 | 20.0 | 9.46 | 0.000 | 12.6 |
|  | 1031.7 | 1.2 | 0 | 0 | 0.2 | 12.0 | 0.139 | 0.576 | 0.223 | 0.114 | 0.0 |
|  | 4850 | 0 | 19.6 | 0 | 73.5 | 13.6 | 94.1 | 96.9 | 97.5 | 702.3 | 0.0 |
| TEST 5 | 29.27 | 1.0 | 4 | 21 | 0.6 | 12.0 | 2.36 | 20.3 | 9.29 | 0.000 | 12.7 |
|  | 1016.9 | 1.0 | 4 | 20 | 0.3 | 12.0 | 0.130 | 0.703 | 0.228 | 0.104 | 0.0 |
|  | 4856 | 6 | 19.4 | 0 | 75.1 | 13.3 | 94.0 | 96.3 | 97.4 | 698.3 | 0.0 |
|  |  |  |  | AVERAGE |  | 11.8 | 2.54 | 20.6 | 9.52 | 0.00 | 12.5 |
|  |  |  |  |  |  | 11.9 | 0.144 | 0.622 | 0.236 | 0.122 | 0.0 |
|  |  |  |  |  |  | 13.5 | 93.8 | 96.8 | 97.4 | 706.7 | 0.0 |

The second set of tests involved using the same system as used on the natural gas vehicle but moving the conditioning catalyst 16 closer to the exhaust manifold (5.5" and 10" vs. 13" and 19") and this decreased the non-methane hydrocarbon emissions to 0.100 g/mi is depicted on Graph 2.

| GRAPH 2: EMISSIONS TEST WITH REPOSITIONED 4K CATALYSTS | | | | | | | | | | |
|---|---|---|---|---|---|---|---|---|---|---|
| BARO | CT-C | N/C | N/H | 02-B | FE 1 | | | | HNOX | CVS |
| EXH | CT-H | D/C | D/H | 02-A | FE 2 | | TOTAL | | NMHC | HWY |
| ODOM | HPM | VAC | VIOL | TEMP | FE 3 | HC | CO | NOX | CO2 | M-H |
| 29.53 | 0.9 | 1207 | 1137 | 0.7 | 11.5 | 2.50 | 20.8 | 8.98 | 0.000 | 12.2 |
| 1362.7 | 1.2 | 929 | 817 | 0.3 | 11.0 | 0.112 | 0.167 | 0.167 | 0.000 | 0.0 |
| 4959 | 727 | 19.8 | 0 | 75.0 | 13.2 | 95.1 | 98.1 | 97.8 | 726.0 | 0.0 |
| | | | AVERAGES | | 11.5 | 2.50 | 20.8 | 8.96 | 0.00 | 12.2 |
| | | | | | 11.6 | 0.112 | 0.167 | 0.187 | 0.100 | 0.0 |
| | | | | | 13.2 | 95.1 | 98.1 | 97.8 | 726.3 | 0.0 |

The first embodiment of the emission control system of the present invention was tested with green (i.e. 0K miles) catalysts, identical to the conditioning catalyst, used as backing light-off catalysts. This system showed a significant reduction in non-methane hydrocarbon emissions to an average of 0.069 g/mi as reported in Graph 3, despite the fact that one of the three large underbody catalysts was removed from the system in this and subsequent test configurations.

The final example, as provided in Graph 4, involved the first attempt to specifically design the rear catalyst for light-off efficiency and compared to the conditioning catalyst, the light-off catalyst utilized a larger volume, 42 cubic inches versus 22 cubic inches, a greater cell density, 400 cpsi versus 200 cpsi and different catalyst formulations, a higher loading and inclusion of an oxygen storage component. In addition, the vehicle was road-driven for an additional 4K miles prior to testing, resulting in a total of 8K miles on the conditioning and underbody catalysts, and 4K miles on the light-off catalysts. As shown in Graph 4, the non-methane hydrocarbon emissions stayed near the same level indicating that the improved design is believed to have compensated for the additional aging of the catalysts. It should also be noted that, with the present emission control system, carbon monoxide and $NO_x$ emissions are believed to be below ULEV standards. Moreover, all of the results were obtained without the use of exhaust gas recirculation (EGR), demonstrating that with this type of system it may be easier to meet ULEV $NO_x$ standards without EGR. The cost savings resulting from the deletion of both EGR and one of the three underbody catalyst bricks more than offsets the added cost of the conditioning and light-off catalysts which comprise the emission regulating assembly.

| GRAPH 3: EMISSION TESTING WITH GREEN CATALYST | | | | | | | | | | | |
|---|---|---|---|---|---|---|---|---|---|---|---|
| | BARO | CT-C | N/C | N/H | 02-B | FE 1 | | | | HNOX | CVS |
| | EXH | CT-H | D/C | D/H | 02-A | FE 2 | | TOTAL | | NHMC | HWY |
| | ODOM | RPM | VAC | VIOL | TEMP | FE 3 | HC | CO | NOX | CO2 | M-H |
| TEST 1 | 29.04 | 0.6 | 35 | 41 | 0.5 | 12.1 | 2.38 | 20.2 | 8.46 | 0.000 | 12.8 |
| | 1031.0 | 0.5 | 34 | 42 | 0.2 | 12.1 | 0.069 | 0.239 | 0.154 | 0.063 | 0.0 |
| | 5090 | 30 | 19.1 | 0 | 74.8 | 13.9 | 96.8 | 98.7 | 98.1 | 694.3 | 0.0 |
| TEST 2 | 29.04 | 3.1 | 1028 | 1123 | 0.6 | 11.7 | 2.27 | 20.5 | 8.99 | 0.000 | 12.5 |
| | 1049.1 | 1.3 | 848 | 811 | 0.1 | 11.8 | 0.088 | 0.324 | 0.157 | 0.081 | 0.0 |
| | 5102 | 721 | 19.3 | 0 | 78.6 | 13.6 | 95.8 | 98.3 | 98.2 | 711.4 | 0.0 |
| TEST 3 | 29.25 | 1.3 | 1155 | 1006 | 0.0 | 12.0 | 2.24 | 20.7 | 8.59 | 0.000 | 12.6 |
| | 1029.9 | 1.4 | 861 | 798 | 0.1 | 11.9 | 0.072 | 0.249 | 0.165 | 0.065 | 0.0 |
| | 5111 | 729 | 19.3 | 0 | 78.6 | 13.9 | 96.5 | 98.7 | 98.0 | 702.7 | 0.0 |
| | | | | AVERAGES | | 11.9 | 2.30 | 20.5 | 8.68 | 0.00 | 12.6 |
| | | | | | | 11.9 | 0.076 | 0.271 | 0.159 | 0.069 | 0.0 |
| | | | | | | 13.8 | 96.4 | 98.6 | 98.1 | 702.8 | 0.0 |

| GRAPH 4: EMISSION TESTING WITH LIGHT-OFF CATALYST AND CONDITIONING CATALYST | | | | | | | | | | | |
|---|---|---|---|---|---|---|---|---|---|---|---|
| | BARO | CT-C | N/C | N/H | 02-B | FE 1 | | | | HNOX | CVS |
| | EXH | CT-H | D/C | D/H | 02-A | FE 2 | | TOTAL | | NMHC | HWY |
| | ODOM | RPM | VAC | VIOL | TEMP | FE 3 | HC | CO | NOX | CO2 | M-H |
| TEST 1 | 29.50 | 1.0 | 931 | 852 | 0.7 | 10.9 | 2.48 | 22.6 | 9.94 | 0.000 | 11.7 |
| | 1133.7 | 1.3 | 771 | 605 | 0.1 | 11.1 | 0.070 | 0.340 | 0.249 | 0.062 | 0.0 |
| | 13468 | 555 | 17.6 | 0 | 80.0 | 12.6 | 97.0 | 98.3 | 97.3 | 759.6 | 0.0 |
| TEST 2 | 29.18 | 0.5 | 1105 | 1038 | 0.6 | 11.1 | 2.39 | 21.8 | 9.72 | 0.000 | 12.1 |

-continued

GRAPH 4: EMISSION TESTING WITH LIGHT-OFF CATALYST AND CONDITIONING CATALYST

|        | BARO<br>EXH<br>ODOM | CT-C<br>CT-H<br>RPM | N/C<br>D/C<br>VAC | N/H<br>D/H<br>VIOL | 02-B<br>02-A<br>TEMP | FE 1<br>FE 2<br>FE 3 | HC | TOTAL<br>CO | NOX | HNOX<br>NMHC<br>CO2 | CVS<br>HWY<br>M-H |
|---|---|---|---|---|---|---|---|---|---|---|---|
|        | 1091.6 | 0.6 | 824  | 764  | 0.3  | 11.5 | 0.065 | 0.290 | 0.145 | 0.055 | 0.0  |
|        | 13468  | 682 | 19.2 | 0    | 77.4 | 13.0 | 97.1  | 98.5  | 98.4  | 736.4 | 0.0  |
| TEST 3 | 29.37  | 2.1 | 1093 | 1023 | 0.7  | 10.8 | 2.40  | 23.2  | 9.75  | 0.000 | 11.9 |
|        | 1115.9 | 1.5 | 835  | 743  | 0.3  | 11.3 | 0.069 | 0.282 | 0.142 | 0.062 | 0.0  |
|        | 13478  | 680 | 20.2 | 0    | 77.0 | 12.8 | 7.0   | 98.6  | 98.5  | 750.7 | 0.0  |
| TEST 4 | 29.51  | 0.5 | 1134 | 1157 | 0.0  | 10.8 | 0.00  | 0.0   | 0.00  | 0.000 | 11.7 |
|        | 0.0    | 0.7 | 806  | 727  | 0.0  | 11.1 | 0.078 | 0.291 | 0.148 | 0.070 | 0.0  |
|        | 13490  | 690 | 19.6 | 0    | 73.5 | 12.7 | 0.0   | 0.0   | 0.0   | 762.0 | 0.0  |
| TEST 5 | 29.65  | 1.9 | 13   | 54   | 0.0  | 10.9 | 0.00  | 0.0   | 0.00  | 0.000 | 11.9 |
|        | 0.0    | 1.7 | 10   | 43   | 0.0  | 11.3 | 0.070 | 0.375 | 0.123 | 0.062 | 0.0  |
|        | 13501  | 2   | 20.9 | 0    | 72.0 | 12.8 | 0.0   | 0.0   | 0.0   | 746.9 | 0.0  |
| TEST 6 | 29.74  | 1.6 | 1171 | 1029 | 0.0  | 10.9 | 0.00  | 0.0   | 0.00  | 0.000 | 11.8 |
|        | 0.0    | 0.9 | 870  | 803  | 0.0  | 11.3 | 0.098 | 0.415 | 0.127 | 0.090 | 0.0  |
|        | 13512  | 725 | 20.0 | 0    | 78.3 | 12.7 | 0.0   | 0.0   | 0.0   | 751.7 | 0.0  |
|        |        |     |      | AVERAGES | | 10.9 | 2.42  | 22.5  | 9.80  | 0.00  | 11.9 |
|        |        |     |      |      |      | 11.3 | 0.075 | 0.332 | 0.156 | 0.067 | 0.0  |
|        |        |     |      |      |      | 12.8 | 97.0  | 98.5  | 98.1  | 751.2 | 0.0  |

The emission control system contains many attributes which directly contribute to enhanced emissions performance and durability. First, the EGO sensor is protected from excessive thermal and chemical degradation as the EGO sensor is mounted farther downstream resulting in lower temperatures and some filtering of exhaust contaminants by the conditioning catalyst that would otherwise end up on the EGO sensor. Second, the conditioning catalyst acts as a buffer of the exhaust gases so that the EGO sensor responds to the mean air/fuel ratio rather than specific air/fuel ratios from individual cylinders. Third, the conditioning catalyst buffers and straightens flow to both the EGO sensor and the light-off catalyst, resulting in more accurate air/fuel readings by the EGO sensor and full utilization of the frontal area of the light-off catalyst which in turn causes less channeling and maldistribution of exhaust gases than otherwise experienced. In addition, the EGO sensor is tightly sandwiched between two catalysts, thus ensuring good mixing of exhaust gases in the intervening space and resulting in accurate gas sensing and elimination of orientational effects of the EGO sensor relative to the main flow direction. The tight sandwiching arrangement of the conditioning and light-off catalysts also ensures that heat generated by exothermic exhaust gas reactions occurring in the conditioning catalyst will be transferred to the light-off catalyst rather than lost to the cold surroundings, thus ensuring quick warm-up of the light-off catalyst. Similarly, dividing the exhaust gas conditioning function and light-off functions between two catalysts ensures that the conditioning catalyst can be maintained small enough and open enough that it does not become a significant thermal sink during light-off. Likewise, the small, open structure of the conditioning catalyst also ensures emissions and heat blow-through during high-speed driving conditions, thus protecting the conditioning catalyst from excessive temperature spikes. Under warmed-up conditions, especially high-speed, the conditioning catalyst and light-off catalyst work together to spread the exothermic reaction, thereby limiting peak temperatures in both catalysts and contributing to improved thermal durability. Poison deposition is likewise spread out such that no single catalyst is excessively poisoned.

In general, this invention extends the concept of catalyst staging and essentially increases the use of three types of catalysts, conditioning catalyst and light-off catalyst and main downstream catalyst each with their unique reaction chemistry and conversion regimes to promote the most efficient exhaust gas emission control system. The features outlined above are characteristic of the combined conditioned catalyst, EGO sensor and light-off catalyst emission assembly and represent additional benefits over those already proven for each component separately.

Another example of additional benefits accruing from use of the conditioning catalyst is that, in addition to removing hydrogen, the catalyst concomitantly removes an amount of oxygen before the EGO sensor. This allows for greater engine cylinder-to-cylinder combustion variation while maintaining low emission levels. In this way an engine having a large degree of cylinder-to-cylinder air/fuel ratio variability (i.e., wide fluctuations in exhaust oxygen concentration) can be made to perform, from an emissions standpoint, as one with balanced air/fuel charge to all cylinders.

As engine technology has improved over the years in areas such as cylinder and combustion chamber design, design of fuel rails, design of multi-port fuel injectors, and intake air distribution, emissions of unburned fuel and oxygen has consistently decreased resulting in a reduced burden of the emissions after treatment system. Under this invention, the conditioning catalyst 16 further decreases the oxygen by about 50% of that coming from the engine 10. The net result is that from a standpoint of exhaust emissions, the conditioning catalyst 16 decreases both the reactive gas load on the EGO sensor and on the main downstream catalysts 20.

In particular, the conditioning catalyst 16 and the EGO sensor 18, work together to produce lower concentrations of oxygen at the main downstream underbody catalyst 20 than normally obtainable. This opens up new reaction pathways for nitrogen oxide that, in turn, greatly enhance the nitrogen oxide conversion efficiency of the main underbody catalysts. Specifically, oxygen, when present, inhibits the reaction between nitrogen oxide and carbon monoxide. Decreasing oxygen to the downstream underbody catalysts 20, with moderation so as not to adversely affect carbon monoxide oxidation, improves the competition between nitrogen oxide and oxygen for available carbon monoxide and increases nitrogen oxide conversion efficiency.

Two Sensor Feedback Control System

In yet another aspect of this invention, an additional first EGO sensor 11 is placed before the conditioning catalyst 16 for the purpose of providing better fuel control during low engine exhaust flow conditions or whenever the second EGO sensor 18 is not suited for primary control, such as with a green engine or conditioning catalyst. Under low flow conditions, such as engine idle, EGO sensor switching is slow and is made even slower by the damping effect of the conditioning catalyst. This is especially a problem for fresh, i.e., low mileage, catalysts where oxygen storage levels are highest and damping is most pronounced. Thus it is desirable to be able to switch at will between control via the sensor in front of the conditioning catalyst and control via the downstream sensor depending on engine speed and catalyst age. In general, this will not result in loss of benefit from the primary control strategy involving the sensor behind the conditioning catalyst, because control will only be transferred to the front sensor under conditions where pollutant emission rates are low and catalyst efficiencies are high.

The strategy used for switching control between the first oxygen sensor or fore sensor 11 and second oxygen sensor or aft sensor is based on information stored in the engine processor (contained in closed loop control means 14). Engine operating parameters such as manifold vacuum and engine rpm can be used to identify driving modes (such as idle) where control should be switched to the first oxygen sensor 11.

It should also be recognized that the two exhaust gas sensors can also be used in tandem as a diagnostic device for monitoring the performance of the conditioning catalyst 16 using techniques customary to the industry.

What is claimed is:

1. An emission control system for controlling noxious components emitted from an exhaust stream produced by the combustion of an air/fuel mixture in an internal combustion engine, including an engine exhaust manifold through which the exhaust stream is passed, the system comprising:

an emission regulating assembly, comprising:

a conditioning catalyst, in communication with the exhaust stream, for removing hydrogen from the exhaust stream to provide a conditioned exhaust stream;

a light-off catalyst, in communication with the conditioned exhaust stream, for achieving a light-off temperature to provide a lit-off and conditioned exhaust stream; and an exhaust gas oxygen sensor, positioned between the conditioning catalyst and the light-off catalyst, for sensing an oxygen concentration of the conditioned exhaust stream; and a downstream catalyst, in communication with the lit-off and conditioned exhaust stream, for further eliminating noxious components from the exhaust stream to produce a purified exhaust stream.

2. The system of claim 1 where the conditioning catalyst removes at least 75% of the hydrogen present in the exhaust stream.

3. The system of claim 1 where the conditioning catalyst has a space velocity which results in negligible damping upon the oxygen sensor.

4. The system of claim 3 where the conditioning catalyst has a space velocity of from 50,000 $h^{-1}$ to 1,000,000 $h^{-1}$.

5. The system of claim 1 which has the capacity to store less than 1000 micro-moles of oxygen atoms.

6. The system of claim 1 where the conditioning catalyst has between 75 to 400 cpi, a diameter of less than 4.0 inches, and a length of less than 5.0 inches.

7. The system of claim 1 where the light-off catalyst has between 300 and 500 cpi, a diameter of less than 5 inches and a length of less than 5 inches.

8. The system of claim 1 where the light-off catalyst has a volume between 30 and 50 cubic inches.

9. The system of claim 1 where the conditioning catalyst has a volume between 10 and 40 cubic inches.

10. The system of claim 1 where the conditioning catalyst and light-off catalyst have a space of between 1 and 4 inches therebetween.

11. The system of claim 1 wherein the conditioning catalyst is comprised of between 40 and 400 $g/ft^3$ of palladium supported on alumina.

12. The system of claim 1 where the emission regulating assembly is mounted in proximity to the engine exhaust manifold.

* * * * *